No. 822,428. PATENTED JUNE 5, 1906.
H. CHRISMAN.
METER FOR MEASURING LIQUIDS.
APPLICATION FILED OCT. 3, 1904.
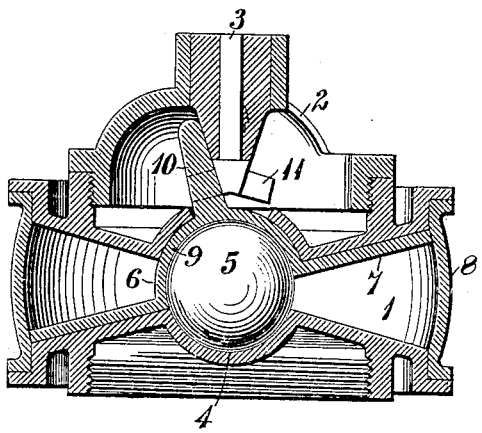
WITNESSES:
Fred H. Miller
C. L. Belcher
INVENTOR
Horace Chrisman
BY
Wiley G. Carr
ATTORNEY

UNITED STATES PATENT OFFICE.

HORACE CHRISMAN, OF WILKINSBURG, PENNSYLVANIA, ASSIGNOR TO PITTSBURG METER COMPANY, A CORPORATION OF PENNSYLVANIA.

METER FOR MEASURING LIQUIDS.

No. 822,428.  Specification of Letters Patent.  Patented June 5, 1906.

Application filed October 3, 1904. Serial No. 227,049.

*To all whom it may concern:*

Be it known that I, HORACE CHRISMAN, a citizen of the United States, and a resident of Wilkinsburg, in the county of Allegheny and State of Pennsylvania, have invented a new and useful Improvement in Meters for Measuring Liquids, of which the following is a specification.

My invention relates to instruments employed for measuring liquids; and it has for its object to provide an instrument which shall be simple, compact, and inexpensive in construction and which shall be adapted to operate successfully in measuring liquids at any temperature.

It is well known that the relative movement of two engaging surfaces is accompanied by less friction if the materials of which the relatively moving parts are composed are different than is the case if the materials are the same, and it is of importance in this art that the piston of the meter shall be light in weight in order that the meter may register the flow of liquid at low pressures and in small volumes. In order to meet these requirements, it has been usual to make either the whole or a considerable portion of the piston of hard rubber and the chamber in which it operates of metal. This construction is fairly satisfactory when employed for measuring liquids at low or medium temperatures; but it is obviously not suitable for hot liquids.

In order to provide a meter which shall have a piston of sufficiently light weight to insure registration of liquids at low pressures and in small volumes and also one which may be utilized for measuring liquids at high temperatures, I have devised the structure shown in the accompanying drawing, in which the single figure is a sectional view of the piston and piston-chamber and a portion of the framework.

The measuring-chamber 1 is of the form usually embodied in meters of the wabbling or nutating piston type and may be formed of any suitable metal or composition of metals. Mounted upon the top of the measuring-chamber 1 is a casting or frame 2, in which is journaled a spindle 3, through which the motion of the piston is communicated to a train of registering-gears (not shown) in accordance with the usual practice.

Mounted in a depression 4 of spherical curvature in the bottom wall of the chamber 1 is a ball 5, which may be of the same material as that of the chamber-walls or of different material. The piston 6 comprises an annular portion 7, the edges of which are located and moved in close proximity to the side walls 8 of the measuring-chamber, and a middle portion 9, which is in the form of a substantially hemispherical shell that fits over the ball 5 and is provided with a projecting pin 10 to engage with the one or the other of two arms 11, which project laterally from the lower end of the spindle 3. This piston is preferably formed of a metal or composition which is different from that of the measuring-chamber walls and also different from that of the ball 5, so that there shall be a minimum amount of friction between these parts in operation.

It will be understood from the illustration and the foregoing description that the piston may move freely upon the ball and that the latter may also turn freely in any direction, a maximum freedom of movement for the piston being thus insured.

I claim as my invention—

1. In a meter, the combination with a measuring-chamber having a ball loosely supported in a spherically-curved socket therein so as to have universal rotary movement, of a piston having a central, spherically-curved portion that rests upon said ball and fits the same uniformly in all positions of the piston.

2. In a meter, the combination with a measuring-chamber having a spherically-curved, central recess in its bottom wall, and a ball loosely supported in said recess for universal rotary movement, of a piston formed of different material from that of which the walls of the measuring-chamber and the ball are composed and having a spherically-curved, central portion that fits over the ball uniformly in all positions of the piston.

In testimony whereof I have hereunto subscribed my name this 24th day of September, 1904.

HORACE CHRISMAN.

Witnesses:
J. C. MORSE,
BIRNEY HINES.